United States Patent [19]

Sugiura et al.

[11] Patent Number: 4,943,380

[45] Date of Patent: Jul. 24, 1990

[54] ANTISTATIC RESIN COMPOSITION WITH TRANSPARENCY CONTAINING PHOSPHONIUM SULPHONATE

[75] Inventors: Masato Sugiura; Hideo Shimizu; Shigeru Imamura; Fumitoshi Sugiura, all of Aichi, Japan

[73] Assignee: Takemoto Yushi Kabushiki Kaisha, Aichi, Japan

[21] Appl. No.: 316,603

[22] Filed: Feb. 27, 1989

Related U.S. Application Data

[63] Continuation-in-part of Ser. No. 98,534, Sep. 18, 1987, abandoned.

[51] Int. Cl.$^5$ .......................... C08K 5/50; C09K 3/16; B05D 7/02; B32B 27/18
[52] U.S. Cl. ........................ 252/8.7; 252/8.6; 252/174.16; 260/DIG. 16; 260/DIG. 19; 558/44; 558/45; 568/9; 568/10
[58] Field of Search ............... 252/8.7, 8.6, 174.16; 260/DIG. 16

[56] References Cited

U.S. PATENT DOCUMENTS

| | | | |
|---|---|---|---|
| 2,772,189 | 11/1956 | Cohen et al. | 106/287.3 |
| 2,837,446 | 6/1958 | Cohen et al. | 428/265 |
| 2,912,352 | 11/1959 | Hopfner et al. | 252/8.6 |
| 3,405,001 | 10/1968 | Iler | 252/500 |
| 4,038,258 | 7/1977 | Singh et al. | 525/437 |
| 4,159,277 | 6/1979 | Gosselink et al. | 558/45 |
| 4,468,433 | 8/1984 | Ben | 428/372 |
| 4,506,070 | 3/1985 | Ben | 528/287 |

FOREIGN PATENT DOCUMENTS 55-082181 6/1980 Japan.
62-230835 10/1987 Japan.

Primary Examiner—A. Lionel Clingman
Attorney, Agent, or Firm—Flehr, Hohbach, Test, Albritton & Herbert

[57] ABSTRACT

An antistatic resin composition with transparency contains 90-99.9 wt % of a synthetic resin selected from polycarbonate or polymethyl methacrylate and 0.1-10 wt % of a heat-resistant antistat containing phosphonium sulfonate shown by the general formula (I) below:

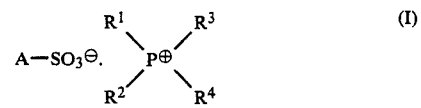

where A is alkyl group with 1-36 carbon atoms, alkenyl group with 4-24 carbon atoms, phenyl group, phenyl group substituted by alkyl group with 1-18 carbon atoms, naphthyl group or naphthyl group substituted by alkyl group with 1-18 carbon atoms, $R^1$, $R^2$ and $R^3$ are identical, each being an aliphatic hydrocarbon group with 1-8 carbon atoms or aromatic hydrocarbon group, and $R^4$ is a hydrocarbon group with 1-18 carbon atoms.

1 Claim, No Drawings

ANTISTATIC RESIN COMPOSITION WITH TRANSPARENCY CONTAINING PHOSPHONIUM SULPHONATE

BACKGROUND OF THE INVENTION

This invention relates to antistatic resin composition with transparency comprising polycarbonate or polymethyl methacrylate and a heat resistant antistat.

Synthetic macromolecular materials are generally hydrophobic. As a result, they tend to become electrostatically charged and this property is a serious obstacle not only in the production processes of such materials but also in using products made therefrom. In the past, electrically conductive agents such as carbon and metallic particles or surfactants were used in various attempts to reduce electrostatic charges of synthetic macromolecular materials by mixing them internally together or by coating the material with an agent. These methods by electrically conductive agents are not generally feasible for many reasons such as the large amount of agents which must usually be used, the difficulty in adding them to a material, the difficulty in obtaining a transparent product and the high cost of such conductive agents. Thus, these agents can be used only in limited situations.

By contrast, since there are many antistates having surfactants as their main constituent, appropriate ones may be selected therefrom according to the situation. In fact, many of the type to be internally added have been considered and tried. When used as an internally applied antistat, however, anionic surfactants are difficult to handle because they are inferior in compatibility and uniform dispersibility or tend to decompose or deteriorate when heated. Cationic surfactants containing quaternary nitrogen in their molecules and amphoteric surfactants, on the other hand, can be used only in limited situations because they are extremely poor in heat resistance although their antistatic characteristics are good. As for non-ionic surfactants, they are relatively superior to the aforementioned ionic surfactants regarding compatibility with synthetic macromolecular materials but tend to be weak in antistatic characteristics and their effects disappear with time at normal or high temperatures. Although metal salts of organic sulfonic acids have been reported especially as internally applied antistats for polycarbonate and polyester resins which are molded at high temperatures (West German Patent 3,004,017), they are not sufficient in compatibility with resins or heat resistance. One adverse consequence of insufficient compatibility is that transparency characteristics of certain macromolecular materials such as polycarbonate are lost with such antistats. There has also been a report on using phosphonium salts or organic sulfonic acids having halogen substituent as a flame retardant (U.S. Pat. No. 4,093,589) but they are not to be expected to serve as antistats at all.

SUMMARY OF THE INVENTION

It is therefore an object of the present invention to provide an antistatic resin composition with transparency comprising polycarbonate or polymethyl methacrylate and a heat-resistant antistat with which the aforementioned problems of conventional agents can be eliminated.

In particular, it is an object of the present invention to provide a heat-resistant antistat which can be internally added to a synthetic macromolecular material having transparency characteristics without adversely affecting its transparency characteristics.

It is another object of the present invention to provide synthetic macromolecular materials containing a heat-resistant antistat and in particular such materials with their transparency characteristics not adversely affected by the antistat contained therein.

The present invention has been completed by the present inventors who discovered, as a result of diligent investigations for obtaining an resin composition with transparency materials having improved antistatic and heat resistant characteristics and reduced dependence on humidity, that phosphonium sulfonates of a special type are desirable and a particularly superior result can be obtained if such a compound is added and mixed to polycarbonate or polymethyl methacrylate.

DETAILED DESCRIPTION OF THE INVENTION

This invention relates to an antistatic resin composition with transparency comprising 90–99.9 wt % of a synthetic resin selected from polycarbonate or polymethyl methacrylate and 0.1–10 wt % of a heat-resistant antistat comprising phosphonium sulfonate shown by the general formula (I) below:

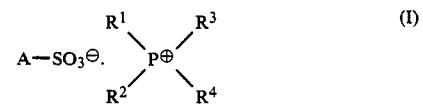

where A is alkyl group with 1–36 carbon atoms, alkenyl group with 4–24 carbon atoms, phenyl group, phenyl group substituted by alkyl group with 1–18 carbon atoms, naphthyl group or naphthyl group substituted by alkyl group with 1–18 carbon atoms, $R^1$, $R^2$ and $R^3$ are identical, each being an aliphatic hydrocarbon group with 1–8 carbon atoms or aromatic hydrocarbon group, and $R^4$ is a hydrocarbon group with 1–18 carbon atoms. with 1–18 carbon atoms, or hydrocarbon group.

Phosphonium sulfonate shown by (I) is composed of an organic sulfonate anion and an organic phosphonium cation. Examples of such organic sulfonate anion include aliphatic sulfonates such as methyl sulfonate, ethyl sulfonate, propyl sulfonate, butyl sulfonate, octyl sulfonate, lauryl sulfonate, myristyl sulfonate, hexadecyl sulfonate, 2-ethylhexyl sulfonate, docosyl sulfonate and tetracosyl sulfonate and their mixtures, substituted phenyl sulfonates such as p-tosylate, butylphenyl sulfonate, dodecylphenyl sulfonate, octadecylphenyl sulfonate, and dibutylphenyl, sulfonate, and substituted or unsubstituted naphthyl sulfonates such as naphthyl sulfonate, diisoprophyl naphthyl sulfonate and dibutylnaphthyl sulfonate. Examples of aforementioned phosphonium cation include aliphatic phosphonium such as tetramethyl phosphonium, tetraethyl phosophonium, tetrabutyl phosphonium, triethylmethyl phosphonium, tributylmethyl phosphonium, tributylethyl phosphonium, trioctylmethyl phosphonium, trimethylbutyl phosphonium, trimethyloctyl phosphonium, trimethyllauryl phosphonium, trimethylstearyl phosphonium, triethyloctyl phosphonium and tributyloctyl phosphonium and aromatic phosphoniums such as tetraphenyl phosphonium, triphenylmethyl phosphonium, triphenylbenzyl phosphonium, tributylbenzyl phosphonium.

Phosphonium sulfonate of the present invention can be obtained by any combination of any of these organic sulfonate anions and organic phosphonium cations but this invention is not limited by the examples given above. Phosphonium sulfonate of the present invention can be produced by mixing metal salt of corresponding organic sulfonate and quaternary phosphonium salt in a solvent and washing out the byproduct inorganic salt with water or extracting the product with an organic solvent such as methanol, isopropanol or acetone. Tetrabutyl phosphonium, dodecylbenzene sulfonate, for example, can be produced with a yield of about 90% by placing 34.8 g of sodium dodecylbenzene sulfonate, 33.9 g of tetrabutyl phosphonium bromide and 200 ml of water in a flask, stirring the mixture for one hour at 80° C., isolating phosphonium sulfonate which separates as an oily layer, washing it with 50 ml of warm water and dehydrating by means of an evaporator. Antistats comprising phosphonium sulfonate shown by (I) as principal components can be used in many different ways to make use of their antistatic and compatibility characteristics and heat resistence in providing such antistatic characteristics to polycarbonate or polymethyl methacrylate. A common way to practice this method is to add the agent directly and to mix it at the time of polymer production or fabrication or by preliminarily preparing master chips containing the agent at a high concentration and such a common method can be used equally well with the present invention. In the case of polycarbonate and polymethylmetacrylate, an agent can be added and mixed together either directly or as master chip at the time of fabrication, thereby yielding colorless synthetic macromolecular materials with transparency characteristics and superior antistatic capability. It can also be added at the time of cast-molding of polymethyl methacrylate. In order to obtain a favorable result by such an internal application method, it is preferable to add an agent of the present invention at the rate of 0.1–10 wt % with respect to the molding composition and it is even more preferable to do so at the rate of 0.3–5 wt %. Antistats of the present invention are more strongly resistant against heat than the conventional ionic surfactants such as anionic, cationic and amphoteric surfactants or non-ionic surfactants and resin compositions have good transparency.

In what follows, examples of the present invention are described for more clearly explaining the present invention but the scope of the present invention is not intended to be limited by these examples.

TEST GROUP 1-1 (Test Examples)

A Brabender mill (produced by Toyo Seiki, Inc.) was used to mix specified amounts of the antistats of the present invention described in Tables 1A–1C with polymethyl methacrylate and polycarbonate. These resin compositions were used to mold sheets of 2 mm in thickness by using a hot press (produced by Toyo Seiki, Inc.). After each sheet was visually inspected and compared with a blank, it was left for one night at constant temperature and humidity of 20 ×65% RH and its surface resistance was measured thereafter in the same environmental conditions by using a super megohm meter (Model SM-5E produced by Toa Denpa Kogyo, Inc.).

The results are shown in Tables 1A–1C wherein *1 indicates log $\Omega$, *2 indicates a mixture with average chain length of $C_{22}H_{45}$, $\phi$ indicates a benzene ring, PMMA indicates polymethylmetacrylate, PC indicates polycarbonate, mixing was effected under the condition of 130° C.×5 minutes for PMMA, 260° C. ×5 minutes for PC, and A, $R_1$–$R_4$ are as explained in connection with the formula (I).

TABLE 1A (Test Examples)

| RESINS | TYPE | ANTISTATS | | | | | | RESULTS | |
|---|---|---|---|---|---|---|---|---|---|
| | | A | $R_1$ | $R_2$ | $R_3$ | $R_4$ | WT % | SURFACE RESISTANCE *1 | APPEARANCE |
| PMMA | 1a | $C_3H_7$ | $C_4H_9$ | $C_4H_9$ | $C_4H_9$ | $C_4H_9$ | 4 | 9.2 | Good |
| | 1a | $C_3H_7$ | $C_4H_9$ | $C_4H_9$ | $C_4H_9$ | $C_4H_9$ | 2 | 9.9 | Good |
| | 1a | $C_3H_7$ | $C_4H_9$ | $C_4H_9$ | $C_4H_9$ | $C_4H_9$ | 1 | 10.3 | Good |
| | 1b | $C_3H_7$ | $\phi$ | $\phi$ | $\phi$ | $CH_3$ | 2 | 10.2 | Good |
| | 1C | $CH_3$ | $C_8H_{17}$ | $C_8H_{17}$ | $C_8H_{17}$ | $CH_3$ | 2 | 10.5 | Good |
| PC | 1a | $C_3H_7$ | $C_4H_9$ | $C_4H_9$ | $C_4H_9$ | $C_4H_9$ | 2 | 10.7 | Good |
| | 1d | $C_2H_5$ | $\phi$ | $\phi$ | $\phi$ | $\phi$ | 2 | 10.8 | Good |

TABLE 1B (Test Examples)

| RESINS | TYPE | ANTISTATS | | | | | | RESULTS | | |
|---|---|---|---|---|---|---|---|---|---|---|
| | | A | $R_1$ | $R_2$ | $R_3$ | $R_4$ | WT % | SURFACE RESISTANCE *1 | APPEARANCE | |
| | | | | | | | | | Transparency | Coloring |
| PMMA | 2a | $C_9H_{19}\phi$ | $C_4H_9$ | $C_4H_9$ | $C_4H_9$ | $C_4H_9$ | 4 | 9.3 | Good | None |
| | 2a | $C_9H_{19}\phi$ | $C_4H_9$ | $C_4H_9$ | $C_4H_9$ | $C_4H_9$ | 2 | 10.3 | Good | None |
| | 2a | $C_9H_{19}\phi$ | $C_4H_9$ | $C_4H_9$ | $C_4H_9$ | $C_4H_9$ | 1 | 10.9 | Good | None |
| | 2b | $C_9H_{19}\phi$ | $\phi$ | $\phi$ | $\phi$ | $CH_3$ | 2 | 10.5 | Good | None |
| | 2c | $C_{14}H_{29}$ | $C_4H_9$ | $C_4H_9$ | $C_4H_9$ | $C_4H_9$ | 2 | 9.8 | Good | None |
| | 2d | *2 | $C_8H_{17}$ | $C_8H_{17}$ | $C_8H_{17}$ | $CH_3$ | 2 | 10.6 | Good | None |
| | 2i | $C_{12}H_{25}\phi$ | $C_4H_9$ | $C_4H_9$ | $C_4H_9$ | $C_4H_9$ | 2 | 10.4 | Good | None |
| | 2j | $C_{13}H_{27}\phi$ | $C_2H_5$ | $C_2H_5$ | $C_2H_5$ | $C_2H_5$ | 2 | 10.0 | Good | None |
| PC | 2a | $C_9H_{19}\phi$ | $C_4H_9$ | $C_4H_9$ | $C_4H_9$ | $C_4H_9$ | 2 | 11.1 | Good | None |
| | 2b | $C_9H_{19}\phi$ | $\phi$ | $\phi$ | $\phi$ | $CH_3$ | 2 | 11.5 | Good | None |
| | 2e | $C_8H_{17}$ | $C_4H_9$ | $C_4H_9$ | $C_4H_9$ | $\phi\text{-}CH_2$ | 2 | 10.4 | Good | None |
| | 2i | $C_{12}H_{25}\phi$ | $C_4H_9$ | $C_4H_9$ | $C_4H_9$ | $C_4H_9$ | 2 | 10.9 | Good | None |

TABLE 1C
(Test Examples)

| RESINS | TYPE | ANTISTATS A | $R_1$ | $R_2$ | $R_3$ | $R_4$ | WT % | RESULTS SURFACE RESISTANCE *1 | APPEARANCE Transparency | Coloring |
|---|---|---|---|---|---|---|---|---|---|---|
| PMMA | 3a | *2 | $C_4H_9$ | $C_4H_9$ | $C_4H_9$ | $C_4H_9$ | 4 | 9.8 | Good | None |
| | 3a | *2 | $C_4H_9$ | $C_4H_9$ | $C_4H_9$ | $C_4H_9$ | 2 | 10.5 | Good | None |
| | 3a | *2 | $C_4H_9$ | $C_4H_9$ | $C_4H_9$ | $C_4H_9$ | 1 | 11.2 | Good | None |
| | 3b | *2 | φ | φ | φ | $CH_3$ | 2 | 10.9 | Good | None |
| | 3C | *2 | $C_2H_5$ | $C_2H_5$ | $C_2H_5$ | $CH_3$ | 2 | 9.8 | Good | None |
| PC | 3a | *2 | $C_4H_9$ | $C_4H_9$ | $C_4H_9$ | $C_4H_9$ | 2 | 11.5 | Good | None |
| | 3b | *2 | φ | φ | φ | $CH_3$ | 2 | 11.8 | Good | None |

TEST GROUP 1-2 (Comparison Examples)

Conventional antistats in Table 2 were used for similar tests as described above. The results of comparisons and measurements are shown in Table 2.

TABLE 2
(Comparison Examples)

| RESINS | TYPE | ANTISTATS | WT % | RESULTS SURFACE RESISTANCE *1 | APPEARANCE Transparency & Coloring |
|---|---|---|---|---|---|
| PMMA | a' | Dodecylbenzene sulfonate Na | 4 | 11.3 | White, turbid |
| | a' | Dodecylbenzene sulfonate Na | 2 | 12.8 | White, turbid |
| | b' | Alkyl (C = 14-15) sulfonate Na | 2 | 11.1 | White, turbid |
| | c' | Glycerine monostearate | 2 | 13< | Good, no coloring |
| | d' | Lauryltrimethyl ammonium chloride | 2 | 12.0 | Turbid, Yellowing |
| | e' | Lauryltrimethyl ammonium tosplate | 2 | 11.8 | Yellowing |
| | h' | Tetrabutyl phosphonium paramino benzene sulfonate | 2 | 11.5 | Yellowing |
| PC | a' | Dodecylbenzene sulfonate Na | 2 | 12.8 | Turbid Yellowing |
| | c' | Glycerine monostearate | 2 | 13< | Slight Yellowing |
| | e' | Lauryltrimethyl ammonium tosylate | 2 | 12.7 | Yellowing |
| | i' | Tetraphenyl phosphonium trichlorobenzene sulfonate | 2 | 13< | Good, no coloring |

The tables presented above show clearly that antistats of the present invention are not only resistant against heat and unaffected by humidity but also capable of effectively providing improved antistatic and transparency characteristics to polycarbonate or polymethyl methacrylate resin composition.

What is claimed is:

1. An antistatic resin composition with transparency characteristics comprising 90-99.9 wt % of a synthetic resin selected from polycarbonate or polymethyl methacrylate and 0.1-10 wt % of a heat-resistant antistat comprising phosphonium sulfonate shown by the general formula (I) below:

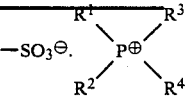

(I)

wherein A is alkyl group with 1-36 carbon atoms, alkenyl group with 4-24 carbon atoms, phenyl group, phenyl group substituted by alkyl group with 1-18 carbon atoms, naphthyl group or naphthyl group substituted by alkyl group with 1-18 carbon atoms, $R^1$, $R^2$ and $R^3$ are identical, each being an aliphatic hydrocarbon group with 1-8 carbon atoms or aromatic hydrocarbon group, and $R^4$ is a hydrocarbon group with 1-18 carbon atoms.

* * * * *